United States Patent
Sweat

(10) Patent No.: US 8,185,228 B2
(45) Date of Patent: *May 22, 2012

(54) AUTOMATED PROCESS FOR MANUFACTURING RADIATION FILTERS FOR RADIATION TREATMENT MACHINES INCLUDING TRACKING THEREOF

(75) Inventor: Richard L. Sweat, Longwood, FL (US)

(73) Assignee: .Decimal, Inc., Sanford, FL (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/467,629

(22) Filed: May 18, 2009

(65) Prior Publication Data

US 2009/0287334 A1 Nov. 19, 2009

Related U.S. Application Data

(60) Provisional application No. 61/054,250, filed on May 19, 2008.

(51) Int. Cl.
*G06F 19/00* (2011.01)

(52) U.S. Cl. ............ 700/117; 700/95; 700/96; 700/180; 700/184

(58) Field of Classification Search .............. 700/95–98, 700/100, 117, 160, 180, 184; 378/156, 159
See application file for complete search history.

(56) References Cited

U.S. PATENT DOCUMENTS

| | | | | |
|---|---|---|---|---|
| 5,014,290 A * | 5/1991 | Moore et al. | .................. | 378/145 |
| 6,381,304 B1 * | 4/2002 | Shoenfeld et al. | .............. | 378/65 |
| 6,980,871 B1 * | 12/2005 | Sweat | ............................ | 700/97 |
| 7,603,191 B2 * | 10/2009 | Gross | ............................. | 700/97 |
| 2002/0198616 A1 * | 12/2002 | Crampton et al. | .............. | 700/99 |
| 2003/0227628 A1 * | 12/2003 | Kreimer et al. | ............... | 356/419 |
| 2005/0140957 A1 * | 6/2005 | Luijkx et al. | .................... | 355/71 |
| 2005/0220265 A1 * | 10/2005 | Besson | ........................... | 378/16 |
| 2006/0253214 A1 * | 11/2006 | Gross | ............................. | 700/97 |
| 2007/0244802 A1 * | 10/2007 | Scruton et al. | ................. | 705/37 |
| 2009/0287334 A1 * | 11/2009 | Sweat | .......................... | 700/100 |

FOREIGN PATENT DOCUMENTS

WO 01/71603 9/2001

* cited by examiner

*Primary Examiner* — Ramesh Patel

(74) *Attorney, Agent, or Firm* — Allen, Dyer, Doppelt, Milbrath & Gilchrist, P.A

(57) ABSTRACT

Automating the process for providing a radiation filter is based on different software programs executed by a computer system. The software programs include customer interface software, tool path generation software and manufacture scheduling software. The customer interface software imports into a database a customer file for the radiation filter, and each of the different software programs set a flag in the database upon completion of their task. Tracking software tracks progress on manufacture of the radiation filter based on the different corresponding flags set in the database. The customer file is provided by a customer, and the customer remotely accesses the database to view progress on the manufacture of the radiation filter.

35 Claims, 14 Drawing Sheets decimal Direct

56

Filter Holding Queue
Ordering for Site ID: 1234 ▼

| Select | Patient Id | Comp Id | Received by | Received Date | Priority | Status |
|---|---|---|---|---|---|---|
| ☐ | 1234567 | IAI-LPO-APER-MS | E-MAIL | | | 59 OK |

UPLOAD

Add File To List

[                    ] Browse  — 58

☐ I agree to the terms and conditions — 62
Please ship for Saturday delivery ○ Yes ⦿ No (Additional fees may apply)
Place an Order Select All
Deselect All Delete Selected
Edit Selected

AUTOMATED PROCESS FOR MANUFACTURING RADIATION FILTERS FOR RADIATION TREATMENT MACHINES INCLUDING TRACKING THEREOF

RELATED APPLICATIONS

This application claims the benefit of U.S. Provisional Application Ser. No. 61/054,250 filed May 19, 2008, and U.S. application Ser. No. 12/467,610 filed May 18, 2009, the entire contents of which are incorporated herein by reference.

FIELD OF THE INVENTION

The present invention relates to the field of radiation therapy, and in particular, to the process of providing patient specific radiation filters used in radiation treatment machines.

BACKGROUND OF THE INVENTION

Intensity modulated radiation therapy (IMRT) is a treatment method for cancer patients requiring radiation treatment. IMRT is an extremely precise method of treatment delivery where the radiation dose conforms to the target and avoids the surrounding critical structures. Rather than having a single large radiation beam pass through the body, with IMRT the treatment is delivered from various angles and the intensity of the radiation beam is varied across the treatment area.

The radiation is effectively broken up into thousands of tiny pencil-thin radiation beams. With millimeter accuracy, these beams enter the body from many angles and intersect on the cancer. This results in a high radiation dosage to the tumor and a lower radiation dose to the surrounding healthy tissues.

One method for modulating the intensity of the radiation beam is based on the use of a radiation filter, which is also known as a compensator. Each radiation filter is specifically designed for a patient.

A patient specific radiation filter is machined from a solid piece of material, which is also referred to as a radiation filter blank. Each radiation filter is mounted to the radiation therapy machine so that it is directly in the path of the radiation beam generated by the machine. The unique three-dimensional geometry of each machined radiation filter provides the conformal radiation dose distributions required by the cancer patient.

Since each patient specific radiation filter is individually machined from a radiation filter blank, it cannot be reused on other cancer patients. The radiation filter may be machined in-house by a radiation treatment center, or alternatively, ordered from an outside machine shop. The outside machine shop will also be referred to herein as the supplier.

Once an order is received by an outside machine shop, a number of information related tasks need to be performed before a radiation filter blank is actually machined into a radiation filter. For example, modeling and programming functions need to be determined. In addition, for each radiation filter machined, it needs to be properly labeled and verified for accuracy. Consequently, each order for a radiation filter requires a considerable amount of employee intervention before the filter is actually packaged and shipped.

One example of reducing the amount of employee intervention for an outside machine shop providing a patient specific radiation filter is disclosed in U.S. Pat. No. 6,980,871. The '871 patent is incorporated herein by reference in its entirety, and is assigned to the current assignee of the present invention. The '871 patent discloses a method for providing a patient specific radiation filter for a radiation treatment machine based on receiving via e-mail design data for the radiation filter, and comparing the received design data to a radiation filter blank database for selecting a radiation filter blank compatible with the radiation treatment machine from a plurality of radiation filter blanks. The method further includes defining tooling instructions for the selected radiation filter blank, and programming a tooling machine based upon the defined tooling instructions. The programmed tooling machine is operated for machining the selected radiation filter blank into the radiation filter. While the '871 patent offers improvements in providing patient specific radiation filters, there is still a need to further improve the process.

SUMMARY OF THE INVENTION

In view of the foregoing background, it is therefore an object of the present invention to improve the process of manufacturing radiation filters for radiation treatment machines.

This and other objects, features, and advantages in accordance with the present invention are provided by a computer-implemented method for manufacturing at least one radiation filter for a radiation treatment machine using a computer-implemented system comprising a processor and a display operatively coupled to the processor. The method may comprise operating the processor to execute customer interface software for importing into a database a customer file for the radiation filter to be manufactured and setting a corresponding flag in the database after importation of the customer file. The customer file may include design data on the radiation filter.

Tool path generation software may be executed by the processor for generating a tool path based on the design data for the radiation filter to be manufactured and setting a corresponding flag in the database after generation of the tool path. The tool path may define instructions to operate a tooling machine. Manufacture scheduling software may be executed by the processor to schedule a tooling machine to manufacture the radiation filter and setting a corresponding flag in the database after manufacturer of the radiation filter. Tracking software may be executed by the processor for tracking progress on manufacture of the radiation filter based on the different corresponding flags set in the database. The method may further comprise operating the display to display the tracked progress on the manufacture of the radiation filter.

The customer file may be provided by a customer, and the customer may remotely access the database to view progress on the manufacture of the radiation filter. The customer may access the database via the Internet. The customer may also submit inquiries about the manufacture of the radiation filter, and the tracking software may further track status of the inquiries being answered.

The tool path generation software stores in the database start and stop times for generating the tool path for the radiation filter to be manufactured, and the tracking software may read the stored information from the database for display. The tool path generation software may also store in the database at least one of a diameter, a thickness and a material type of the radiation filter to be manufactured, and the tracking software may read the stored information from the database for display. The tool path generation software may also store in the database that sides of the radiation filter to be manufactured are to be adjusted to fit an intended radiation treatment machine, and the tracking software may read the stored information from the database for display.

The tool path generation software may store in the database that the generated tool path has been verified, and the tracking software may read the stored information from the database for display. The tool path generation software may also store in the database a required number of axis associated with the filter to be manufactured, and the tracking software may read the stored information from the database for display.

The manufacture scheduling software may store in the database the tooling machine used to manufacturer the radiation filter, and the tracking software may read the stored information from the database for display. The manufacture scheduling software may store in the database identification of a tooling operator who loaded a radiation filter blank corresponding to the radiation filter into the tooling machine, and the tracking software may read the stored information from the database for display. Similarly, the manufacture scheduling software may store in the database identification of a tooling operator who unloaded the radiation filter after manufacture thereof from the tooling machine, and the tracking software reads the stored information from the database for display.

The manufacture scheduling software may store in the database quality control data associated with the manufactured radiation filter, and the tracking software may read the stored information from the database for display. The manufacture scheduling software may store in the database that the manufactured radiation filter has been cleaned and inspected, and the tracking software may read the stored information from the database for display.

The method may further comprise storing shipping information in the database on the radiation filter, and the tracking software may read the stored information from the database for display. The shipping information may comprise identification of a person who packaged the radiation filter for shipping, and identification of a person who verified a package label associated therewith. In addition, the shipping information may comprise identification of a shipping company used to ship the radiation filter, and a corresponding tracking number associated therewith.

The method may further comprise storing invoicing information in the database on the radiation filter, and the tracking software may read the stored information from the database for display. The invoicing information may comprise a customer number, a description of the radiation filter, and billing information.

Another aspect of the present invention is directed to a computer system comprising a processor, and a display operatively coupled to the processor to execute that above described software.

BRIEF DESCRIPTION OF THE DRAWINGS

FIGS. 5-7 are display screens corresponding to the customer interface software program in accordance with the present invention.

FIGS. 10-14 are display screens corresponding to the tracking software program in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
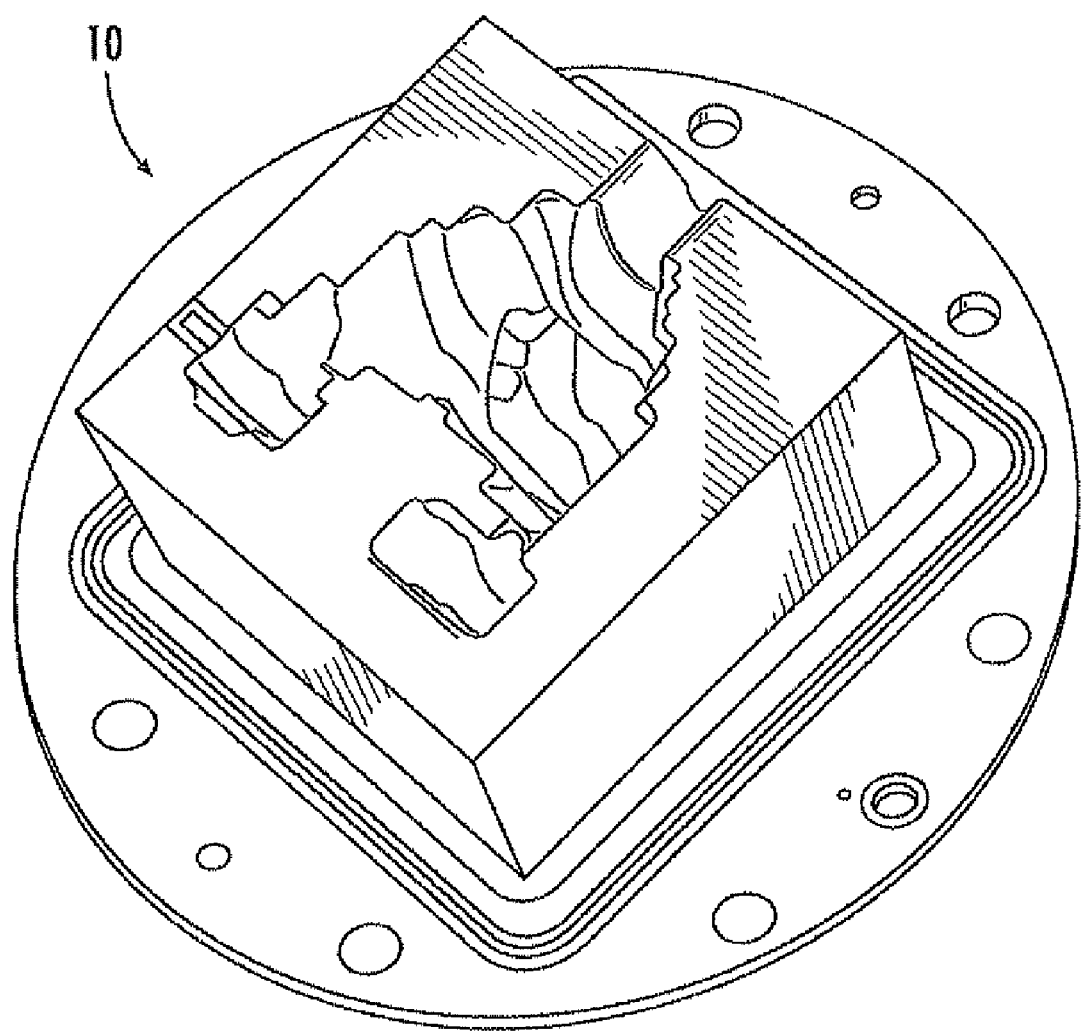
FIG. 1 is a perspective view of a radiation filter to be used in a radiation treatment machine in accordance with the present invention.

Referring initially to FIG. 1, the illustrated radiation filter 10 is patient specific and is machined from a solid piece of material. This solid piece of material may be aluminum or brass, for example. The design data for the radiation filter 10 is provided to the supplier as a data file.

Although the radiation filter 10 is being discussed with respect to IMRT, the disclosed process for manufacturing a radiation filter also applies to other types of therapy, including proton therapy and electron therapy. Such radiation filters would be machined from a solid piece of material, such as plastic (e.g., acrylic), wax, brass and Cerrobend®.

As discussed above, measurement technology at a customer's radiation treatment planning center can determine precise three-dimensional coordinates for a cancerous tumor along with precise locations and densities for the healthy bone and tissue surrounding it. This design data makes it possible to construct a radiation filter 10 that uses variations in the thickness of the metal to vary the intensity of the radiation from a radiation treatment machine, thus producing a radiation field conforming to the topography of the patient.

Figure 2:
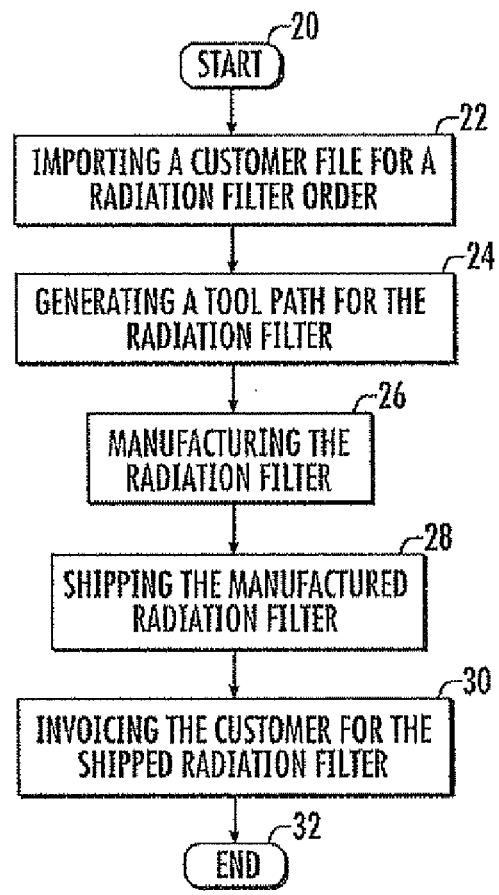
FIG. 2 is a top-level flow chart illustrating the process for providing a radiation filter to a customer in accordance with the present invention.

Referring now to FIG. 2, a top-level flow chart illustrating the process for providing a radiation filter 10 will now be discussed. From the start (Block 20), a customer's file for a radiation filter order is imported to a database at Block 22, a tool path for the radiation filter 10 is generated at Block 24, and the radiation filter 10 is manufactured at Block 26. The process further includes shipping the manufactured radiation filter at Block 28, and invoicing the customer at Block 30. The process ends at Block 32.

Figure 3:
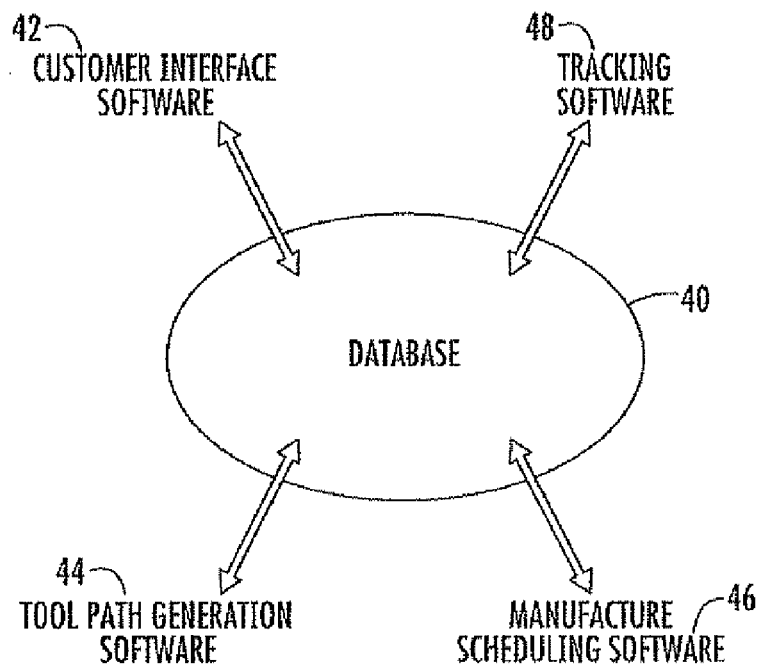
FIG. 3 is a diagram illustrating the different software programs used in automating the process illustrated in FIG. 2.

Automating the process for providing a radiation filter 10 is based on a number of different software programs that interface a database 40, as illustrated in FIG. 3. The software programs include customer interface software 42, tool path generation software 44, manufacture scheduling software 46, and tracking software 48. Each software program performs a specific function. Collectively, the software programs are used to automate the process of providing a radiation filter 10.

Figure 4:
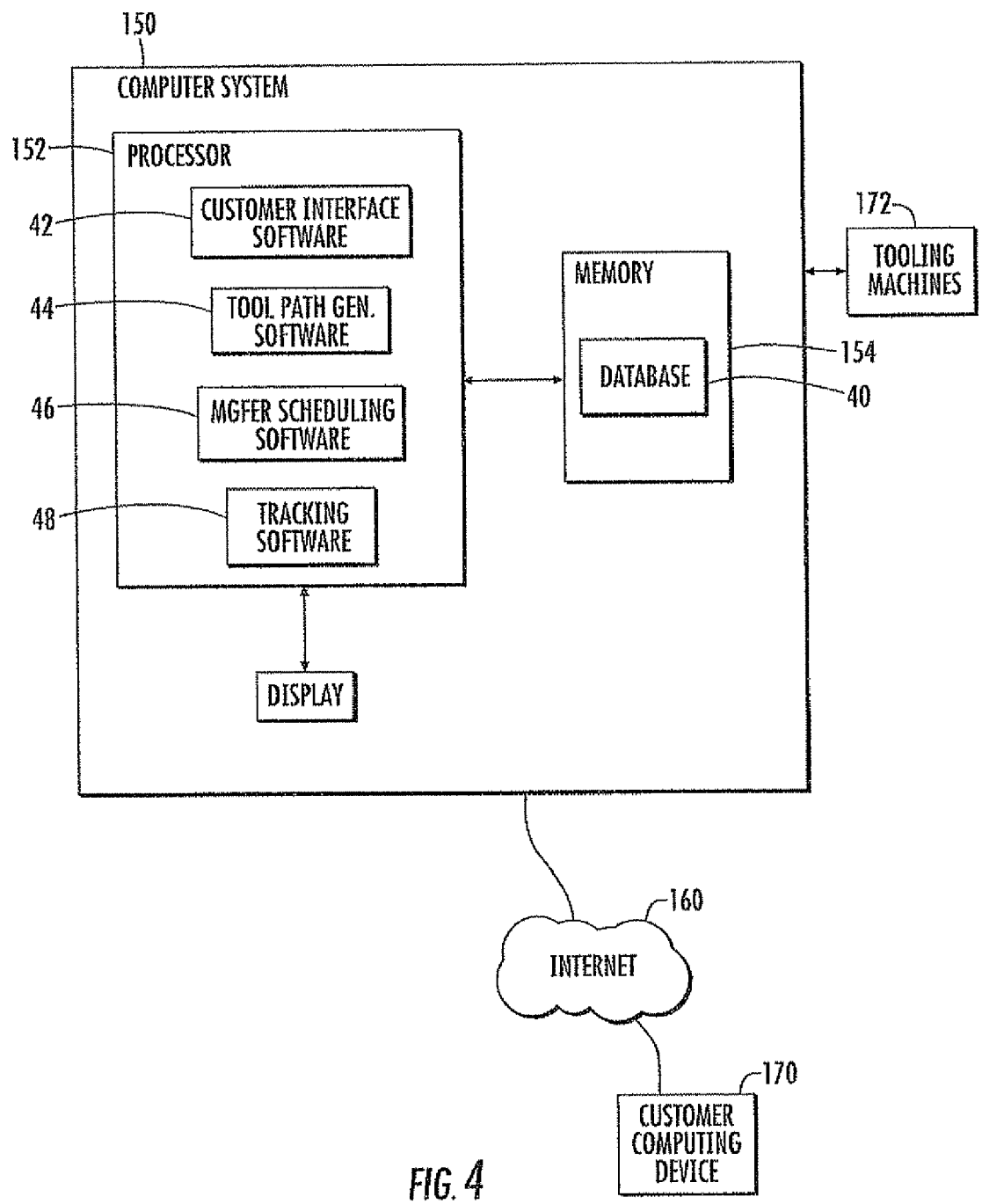
FIG. 4 is a block diagram of a computer-implemented system configured to execute the different software programs illustrated in FIG. 3.

A corresponding computer system 150 executing the different software programs is illustrated in FIG. 4. The computer-implemented system 150 comprises a processor 152 configured to execute the customer interface software 42, the tool path generation software 44, the manufacture scheduling software 46 and the tracking software 48. The database 40 is provided within via a memory 154. The memory 154 is illustrated separate from the processor 152, although in other configurations the memory may be within the processor. As readily appreciated by those skilled in the art, the computer system 150 may be configured as a server, for example. A display 156 is operatively coupled to the processor 152.

The computer-implemented system 150 interfaces the Internet 160 so radiation filter orders may be submitted by a customer computing device 170. The customer computing device 170 allows a customer to remotely place an order for a radiation filter 10, as well as remotely track the status of the radiation filter 10. In addition, the computer system 150 communicates with a plurality of tooling machines 172. As will be described in greater detail below, the tooling machines 172 may be collocated in a physical location, or the tooling machines 172 may be located in different physical locations.

The customer interface software 42 allows the customer computing device 170 to import a customer file into the database 40. The customer may be a radiation treatment facility, for example, and the customer file includes the design data for the radiation filter 10 to be manufactured. After a radiation filter order has been received by the database 40, an order received flag is set within the database 40.

The tool path generation software 44 detects that an order received flag has been set. In response to the order received flag, the tool path generation software 44 generates a tool path for the radiation filter 10 to be manufactured. The generated tool path defines the tools needed by a tooling machine for manufacturing the radiation filter 10, as well as the instructions to operate the tooling machine. Once the tool path has been generated, the information is stored in the database 40. A tool path generation flag is set based on the generated tool path. Even though generation of the tool path is automated, the tool path may still be inspected by an engineer.

The manufacture scheduling software 46 detects that the tool path generation flag has been set. The manufacture scheduling software 46 determines available tooling machines that can be used in the manufacture of the radiation filter 10. All of the possible tooling machines 172 are examined in order to determine which ones are available to manufacture the radiation filter 10. Availability of a tooling machine may be based on compatibility of the tooling machine being able to manufacture a particular radiation filter 10.

Selection or determination of the available tooling machines depends on a number of different factors. For example, selection of the available tooling machines depends on the material to be used in the manufacture of the radiation filter 10, as well as the size of the radiation filter 10. Also for consideration in selection of the available tooling machines is the required number of axis to be machined. For example, a required number of axis to be machined may be 3, 5 or 7-axis, wherein certain tooling machines are able to do 5 or 7-axis machining.

The manufacture scheduling software 46 determine available tooling machines to manufacture the radiation filter 10 based on the generated tool path from a plurality of tooling machines, and selects one of the available tooling machines based on availability for manufacture of the radiation filter 10. As will be discussed in greater detail below, the plurality of tooling machines including the available tooling machines is displayed via display 156. Once the radiation filter 10 has been manufactured and inspected, a manufactured flag is set in the database 40.

The tracking software 48 reads the information stored in the database 40. This allows the tracking software 48 to display on a screen the status of each radiation filter order, as well as showing the progress of the radiation filter order, as will be discussed in greater detail below. The tracking software 48 also displays communications from the customer, and records if action has been taken in response to the communications.

Figure 5:
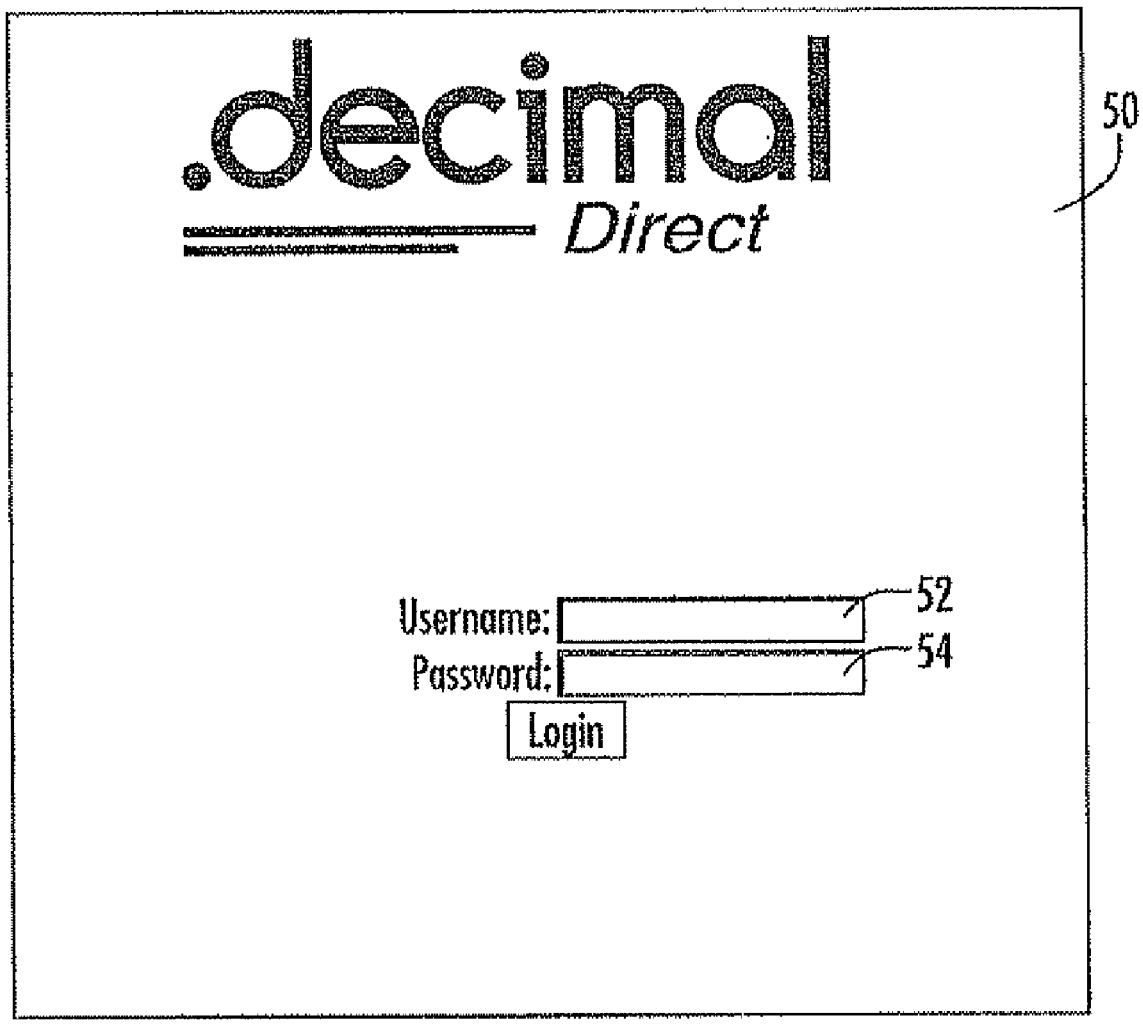
Figure 7:
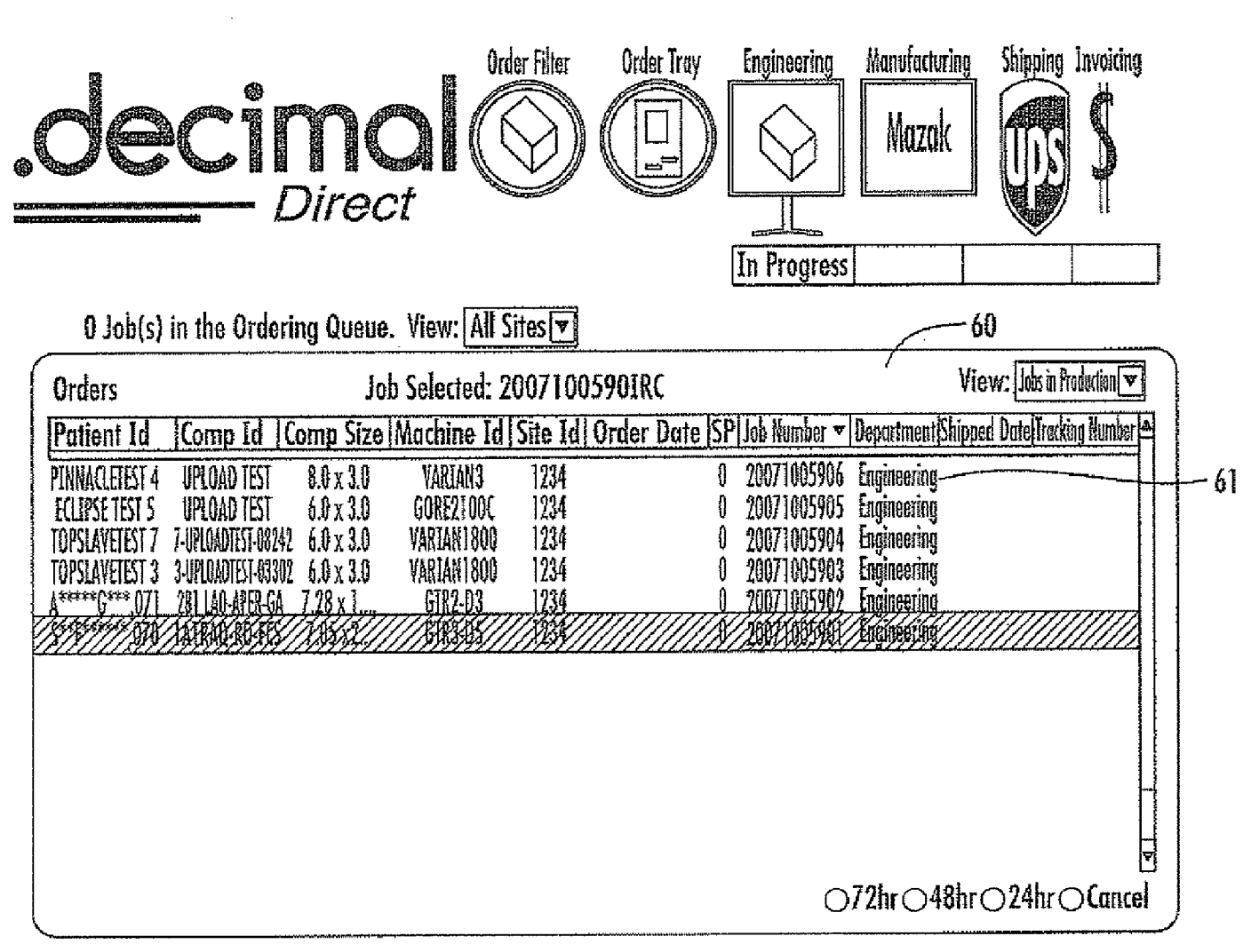

The display screens for the customer interface software 42 will now be discussed in reference to FIGS. 5-7. When a customer wants to place an order for one or more radiation filters 10, the customer logs into a specific customer web site. For example, a display screen 50 allows the customer to enter a username 52 and a password 54, as illustrated in FIG. 5. The illustrated customer web site is referred to as .Decimal® Direct.

Once the customer is logged into the computer-implemented system 150, the customer interface software 42 provides a display screen 56 that allows the customer to upload one or more files containing the design data for the radiation filters 10 to be ordered. Typically, there is a separate file for each radiation filter 10 being ordered. Location of the file to be uploaded is provided via a browse prompt 58 on display screen 56. Once a desired file is located, it is highlighted so that it can be added to field 59. If more than one radiation filter 10 is being ordered, then the customer continues to highlight the other corresponding files so that they are also added to field 59 as a batch order.

Once all of the desired files are in field 59, the customer agrees to the terms and conditions 62 of the order. At this point, a "place order" icon will appear for selection by the customer. Once the customer places the order, the files are imported to the database 40, which is typically at the supplier's location. The order is also displayed for the customer in display screen 60, as illustrated in FIG. 7. The supplier processes the received order. If more than one file is uploaded, then all of the radiation filters 10 corresponding to the uploaded files will be ordered as a batch.

An advantage of the customer interface software 42 is that the customer can also track the status of their order. For example, by selecting field 61 in display screen 60, the customer can verify that the order was received, as well as the status of the order. For example, the illustrated customer files are all in engineering.

The customer interface software 42 allows the customer to remotely access a limited portion of the supplier's tracking software 48, which is referred to herein as .Decimal® Tracking. The customer interface software 42 limits access to their order and not to other customers' orders, as readily appreciated by those skilled in the art.

Another advantage of the customer interface software 42 is that a customer can also view previous orders that they have placed. In other words, the customer is able to obtain a historical review from the database 40 of their previous radiation filter orders. Information such as order/delivery dates, quantity and size of radiation filters that were ordered, as well as costs, etc. may be obtained.

When the customer's file is imported into the database 40, the customer interface software 42 also checks for accuracy of the format of the file. For example, the file is preferably in an ascii format with X,Y,Z coordinates as compared to a fluency map. Beam divergence correction is also created if needed.

Although not illustrated, a create message icon is also available for the customer if a communication link is needed between the customer and the supplier. As noted above, a received order flag is set in the database 40 if the corresponding file has been correctly imported.

In response to detecting the received order flag being set in the database 40, the tool path generation software 44 generates a tool path for the radiation filter 10 to be manufactured. The tool path generation software 44 reads information from the imported customer file and selects the diameter and thickness of a radiation filter blank, as well as the type of material to be used to fill the order.

More particularly, the tool path generation software 44 automates generation of the tool path by applying different rules for different basic parts, and by associating cutting strategies with the geometry and surface of each part. In other words, the different tools that are needed to machine specific surfaces for each radiation filer 10 are identified, and the corresponding CNC codes to be used by a tooling machine are also generated. The tools that are needed and the order in which they are to be used define the tool path for the radiation filer 10 to be manufactured.

In addition to generating the tool path, the tool path generation software 44 enhances the quality of the radiation filter 10 by determining regions that are out of tolerance. The tool path generation software 44 identifies such regions for refinement. Moreover, the tool path generation software 44 also identifies if 5-axis or 7-axis machining is needed. The use of 5-axis or 7-axis corresponds to moving the radiation filter blank in order to create an axis, such as with undercutting a particular surface area of the radiation filter blank.

One example of the tool path generation software 44 is based on using an application programming interface (API) through Surfcam® software provided by Surfware, Inc. An ascii file for a received order is read from the database 40, and is imported into Surfcam®. Surfaces for the radiation filter are created from X,Y,Z points. The various cutting strategies are associated with the geometry and surfaces of the radiation filter 10. Software other than Surfcam® may be used for the tool path generation software 44, as readily appreciated by those skilled in the art.

The generated tool path is written back to the database 40, and a corresponding tool path generation flag is set. Time stamps on starting and stopping of the tool path generation software 44 are also written to the database 40. This allows the tracking software 48 to status the progress of the tool path generation software 44.

Even though generation of the tool path is automated, the tool path may still be inspected by an engineer. Inspection may be based on the engineer viewing a simulation of the radiation filter 10 as would be produced by the generated tool path. The simulated radiation filter 10 allows the engineer to identify if there are any regions or surfaces that are out of tolerance, as well as verifying that there are no gouges in the design.

Verification of the tooling may be performed based on a color coding scheme. For example, red lines in the simulated radiation filter 10 may be used to indicate surfaces that are out of tolerance. The engineer then instructs the tool path generation software 44 to refine the tool path to remove the red lines. Other colored lines, such as green for example, indicate that the surfaces may be within tolerance, but could still use some minor adjusting or refinement. Alternatively, verification of the tooling may be performed by numerical methods, as readily appreciated by those skilled in the art. Verification of the generated tool path is recorded in the database 40.

Figure 8:
FIG. 8 is a display screen corresponding to the manufacture scheduling software program in accordance with the present invention.

The manufacture scheduling software 46 notes the tool path generation flag has been set. The manufacture scheduling software 46 is also referred to herein as resource utilization scheduling software (RUSS). The manufacture scheduling software 46 interacts with the tooling machines in real machine time. In other words, each tooling machine communicates with the computer-implemented system 150. One of the display screens 70 for the manufacture scheduling software 46 is illustrated in FIG. 8.

Figure 9:
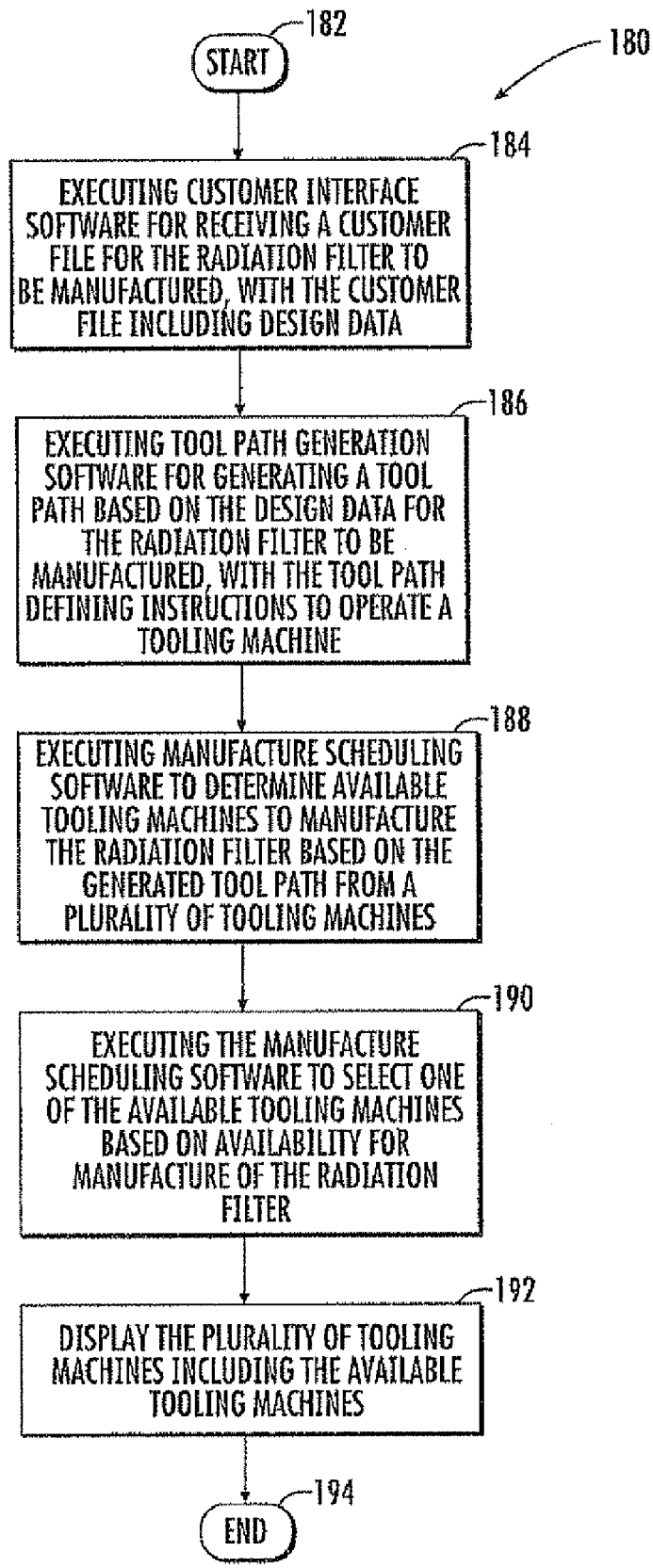
FIG. 9 is a flowchart illustrating a method for manufacturing a radiation filter in accordance with the present invention, particularly with respect to manufacture scheduling.

Referring now to the flowchart 180 illustrated in FIG. 9, a method for manufacturing a radiation filter 10 for a radiation treatment machine using a computer system 150 will now be discussed, particularly with respect to manufacture scheduling. From the start (Block 182), the method comprises operating the processor 152 at Block 184 to execute the customer interface software 42 for receiving a customer file for a radiation filter 10 to be manufactured. The customer file includes design data for the radiation filter 10. The tool path generation software 44 is executed by the processor 152 at Block 186 for generating a tool path based on the design data for the radiation filter 10 to be manufactured. The tool path defines instructions to operate a tooling machine.

The method further comprises operating the processor 152 at Block 188 to execute the manufacture scheduling software 46 to determine available tooling machines to manufacture the radiation filter 10 based on the generated tool path from a plurality of tooling machines. The processor 152 continues executing the manufacture scheduling software 46 at Block 190 to select one of the available tooling machines based on availability for manufacture of the radiation filter 10. The plurality of tooling machines 172 including the available tooling machines are displayed at Block 192 via display 156, and as illustrated in FIG. 8 in field 76. The method ends at Block 194.

As noted above, availability of a tooling machine depends on a number of factors. These factors include, for example, compatibility of the tooling machines to support a size requirement of the radiation filter 10, as well as compatibility of the tooling machines to support a required number of axis to be machined by the tooling machines. Another factor is the tooling machines being compatible with a particular type of material that the radiation filter 10 is to be manufactured from.

The manufacture scheduling software 46 allows manual scheduling of the radiation filters 10 for multiple manufacturing locations. Alternatively, the scheduling may be automatic for multiple locations, as readily appreciated by those skilled in the art. The manufacturing locations of the tooling machines may be in the same general physical location. Alternatively, the manufacturing locations of the tooling machines may be in different physical locations, such as in different cities, for example.

As illustrated in FIG. 8, field 72 illustrates radiation filter orders that have not been assigned to a tooling machine for manufacture. Field 74 illustrates where the unassigned jobs could be assigned to a tooling machine. The unassigned jobs could be assigned in Sanford or Louisville, for example. Even though these two cities are illustrated, actual tooling machine locations may be anywhere in the world. Depending on machine availability, and depending on whether or not the radiation filters 10 to be manufactured are a rush order, a tooling machine will be selected to best meet these needs.

When an unassigned job is highlighted in field 72, the manufacture scheduling software 46 takes into account what material the radiation filter 10 is to be machined from, as well as the required axis (e.g., 3, 5 or 7-axis, for example), and determines which of the tooling machines in field 76 are available, i.e., are capable of manufacturing the radiation filter 10, and selects one of the tooling machines. The current queue or status of the tooling machines in use is illustrated in field 78. This also affects which one of the available tooling machines is to be selected. When manually assigned, the operator will drag and drop each unassigned job to one of the available tooling machines in field 76.

Tab 82 illustrates how orders can be batched together. For example, tooling machine C21 is scheduled to manufacture two radiation filters 10, which is estimated to be completed at time 9:43. Afterwards, at time 11:10, another radiation filter 10 is scheduled to be completed.

Field 84 illustrates placement of the radiation filter blanks in the tooling machine. For the two radiation filters 10 being manufactured, which are to be completed at time 9:43, their location in the tooling machine C21 is illustrated in field 84. In other words, each tooling machine is capable of keeping together batch orders.

The manufacture scheduling software 46 writes to the database 40 as jobs are being assigned to various tooling machines. Corresponding flags are set. When a tooling machine has completed manufacture of a radiation filter 10, certain quality control measurements are made. After verification of the quality control measurements, a corresponding flag is then set in the database 40. When problems arise, the manufacture scheduling software 46 logs the problems in the database 40. The manufacture scheduling software 46 also keeps track of tooling machine maintenance. When a machine is being serviced, it generally goes offline.

The display screens for the tracking software 42 will now be discussed in reference to FIGS. 10-14. The tracking software 48 advantageously displays the status of each order, as well as showing the progress of the different portions of the process. The tracking software 48 is also referred to as .Decimal® Tracking.

Figure 10:
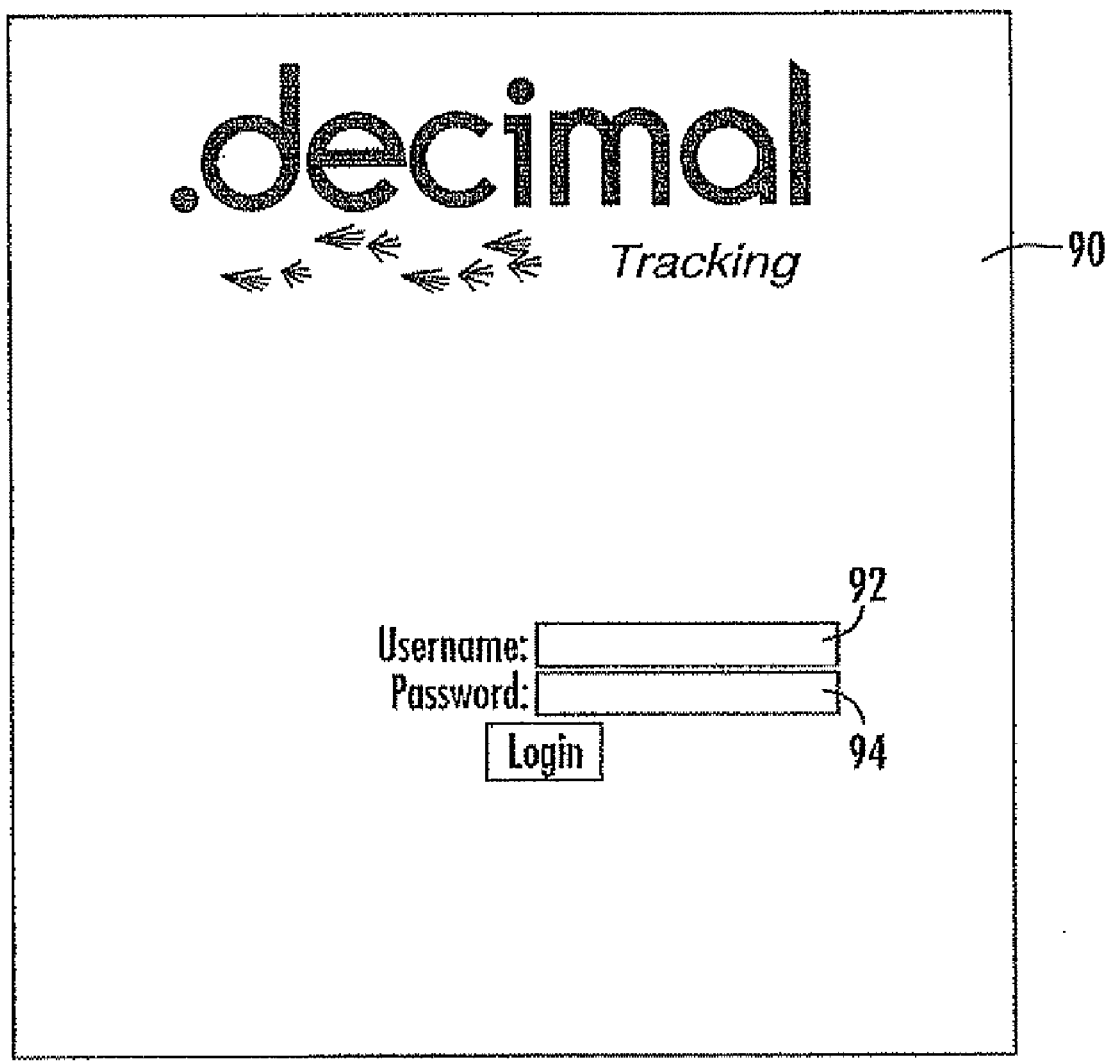
Figure 11:
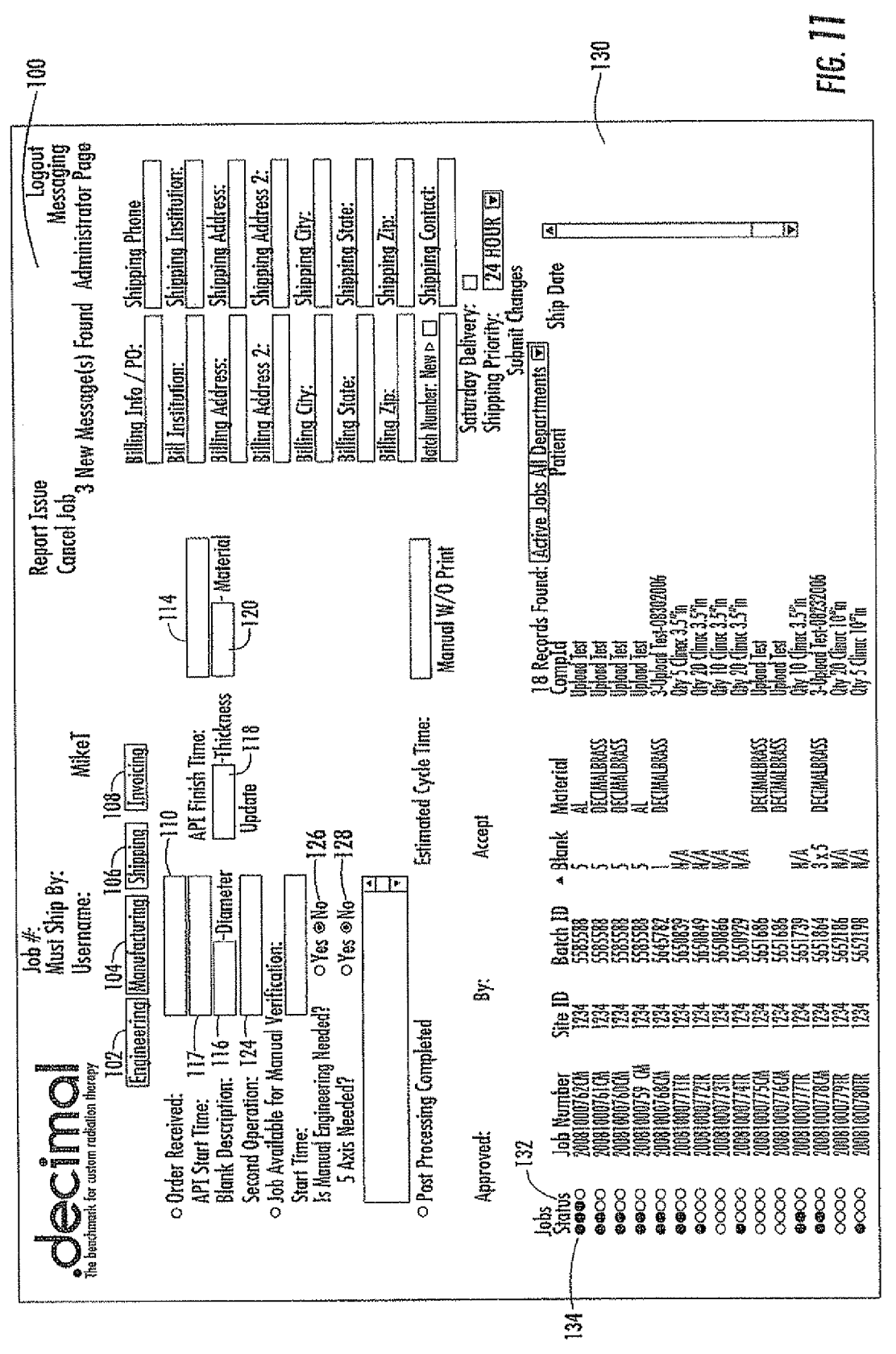

To access the tracking software 48, the supplier logs into the web-based system to view all radiation filter order. A display screen 90 allows the supplier to enter a username 92 and a password 94, as illustrated in FIG. 10. Display screen 100 is then accessed, as illustrated in FIG. 11. A customer is also able to log into the web-based system, but is only able to view their specific radiation filter orders.

In display screen 100, the tracking software 48 allows the supplier to select an Engineering tab 102, a Manufacturing tab 104, a Shipping tab 106 and an Invoicing tab 108. Display screen 100 corresponds to the Engineering tab 102. When a particular order has been uploaded into the database 40 and is ready to be processed, it appears in the order received block 110. As discussed above, tool path generation software 44 is used to generate the tool path for the received order. The start and finish times of application of the tool path software to the file data is recorded in blocks 112 and 114.

Determination by the tool path generation software 44 of the diameter of the radiation filter blank, the thickness of the radiation filter blank as well as the type of material to be used for the radiation filter are recorded in fields 116, 118 and 120.

The Second Operation field 124 corresponds to whether or not the sides of the radiation filter blank need to be adjusted to fit its intended radiation therapy machine. As noted above, even though the tool path is generated by the tool path generation software 44, the supplier has the option of manually verifying the generated tool path, as indicated by fields 126. If the tool path generation software determined that 5-axis or 7-axis tooling is needed, this is indicated in field 128. The use of 5-axis or 7-axis corresponds to rotating the radiation filter blank in order to create an axis, such as with undercutting a particular surface area of the radiation filter blank.

The status of the jobs to be processed is provided in field 130. In the status column 132, the four circles 134 in each row correspond to engineering, manufacturing, shipping and invoicing milestones. When one of these milestones has been completed, the corresponding circle is shaded.

Figure 12:
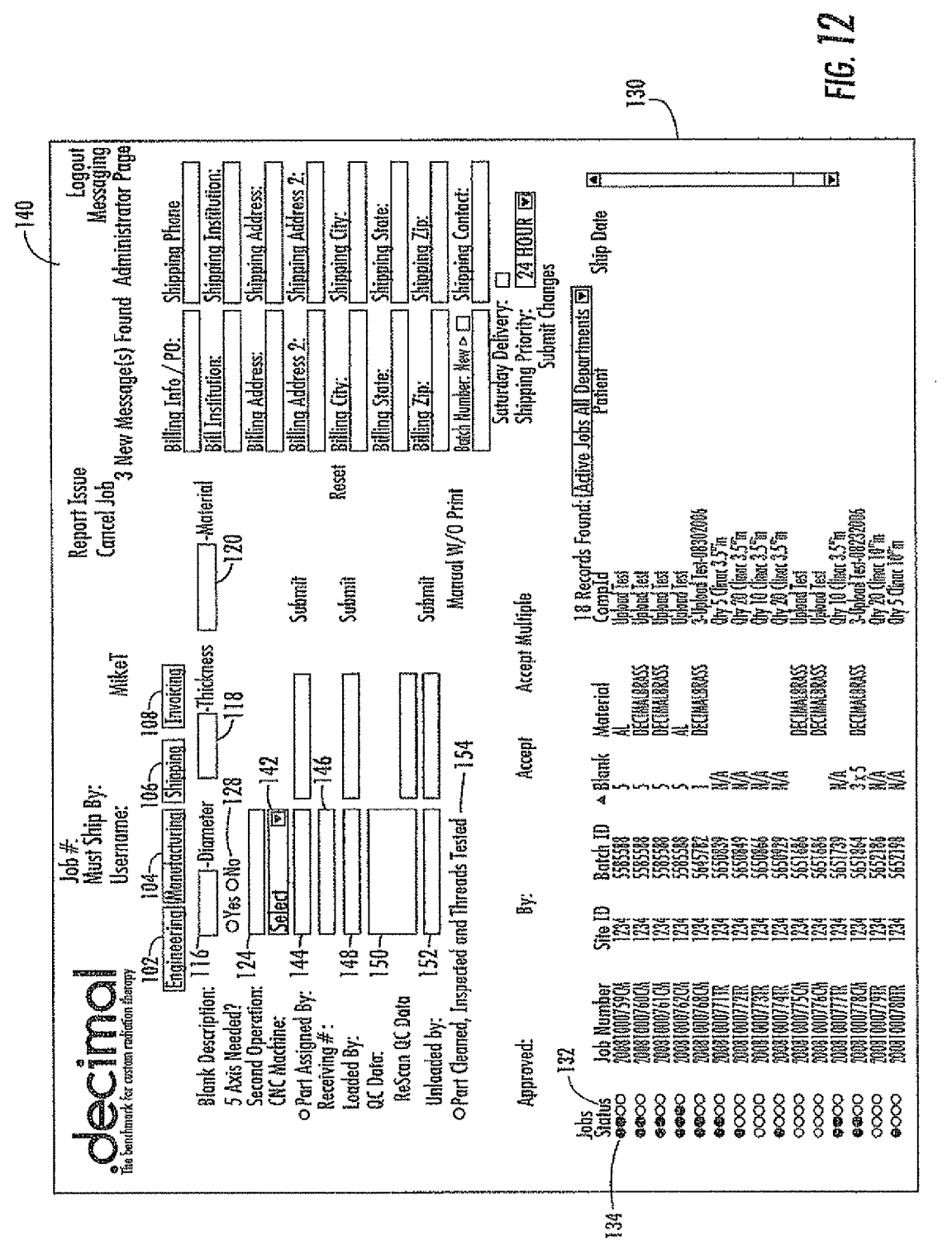

Display screen 140 corresponds to the manufacturing tab 104, as illustrated in FIG. 12. The additional manufacturing information provided in this screen includes the CNC machine in field 142 used to manufacture the radiation filter 10, and the scheduler in field 144 who assigned the part to the tooling machine. The receiving number of the radiation filter 10 is provided in field 146. The tooling operator who loaded the radiation filer blank into the tooling machine is provided in field 148. Quality control data is provided in field 150. The tooling operator who unloaded the radiation filer blank from the tooling machine is provided in field 152. Field 154 indicates that the manufactured radiation filter 10 has been cleaned, inspected and its threads tested.

Figure 13:
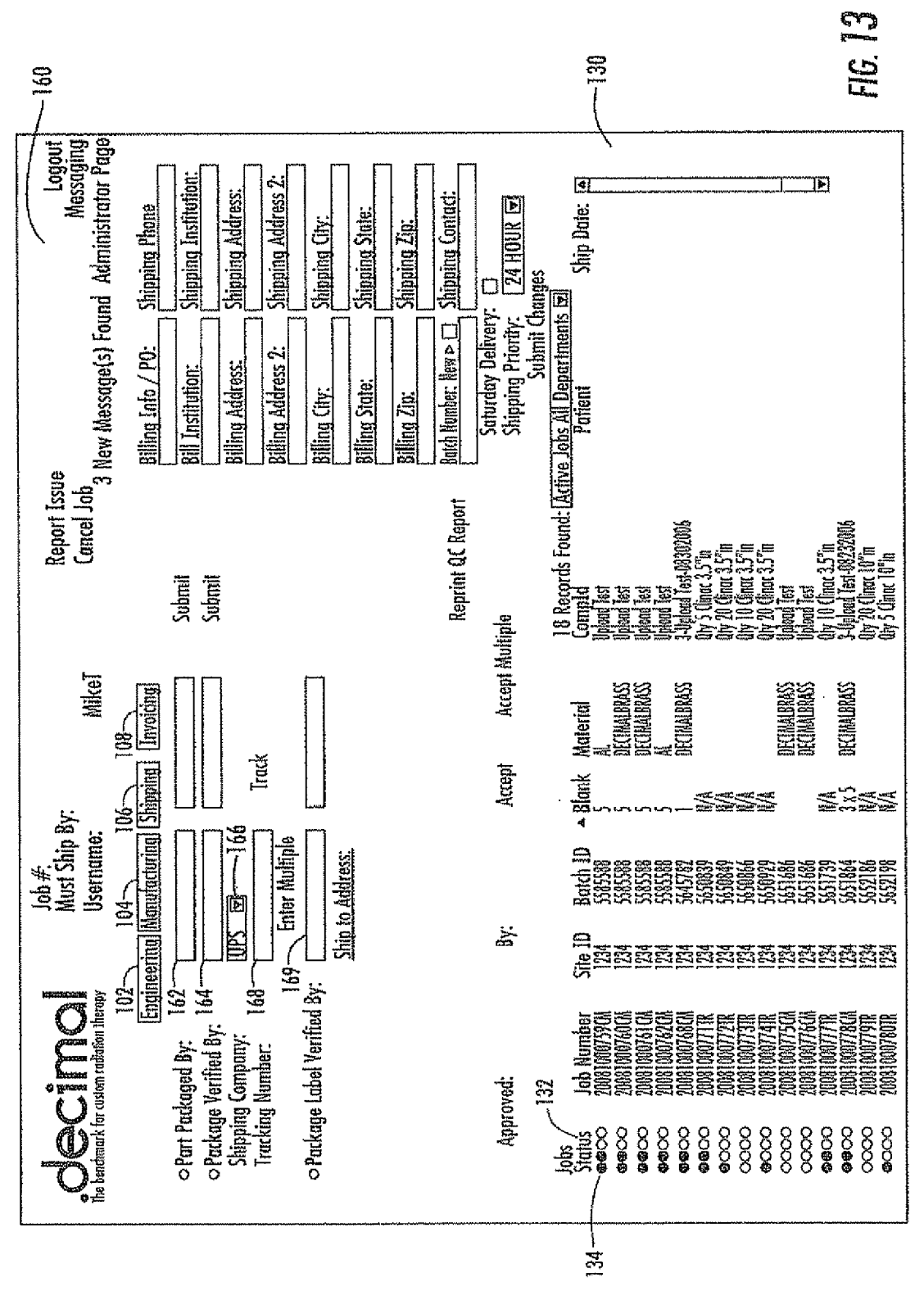

Display screen 160 corresponds to the shipping tab 104, as illustrated in FIG. 13. Fields 162, 164 indicates who packaged the part and who verified the packaged part. The shipping company used to ship the part is provided in field 166, and the corresponding tracking number is provided in field 168. The person who verified the label for the package to be shipped is provided in field 169.

Figure 14:
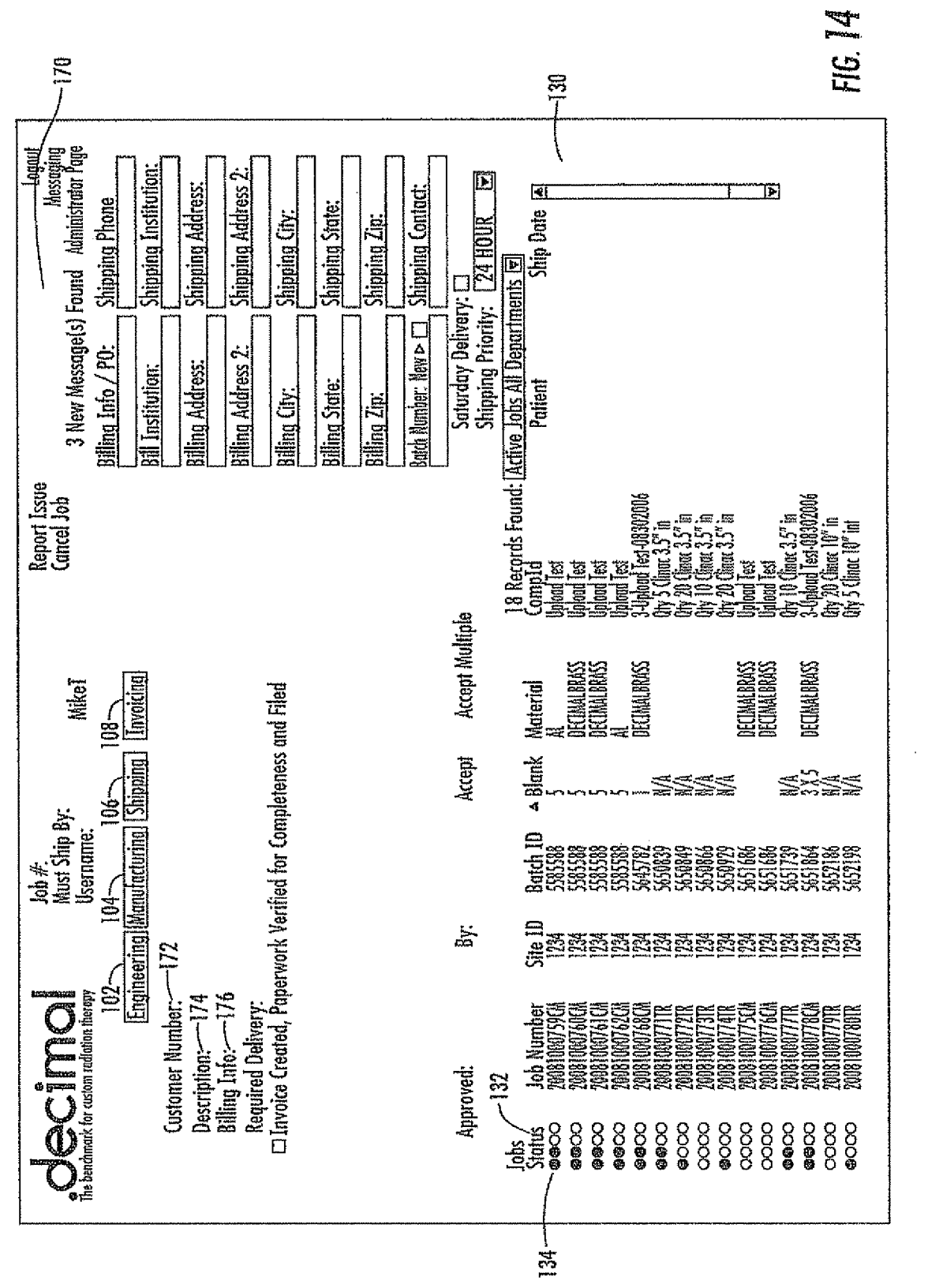

Display screen 170 corresponds to the invoicing tab 108, as illustrated in FIG. 14. The information provided in this screen includes the customer number in field 172, and a description of the order is provided in field 174. The billing information is provided in field 176.

The tracking software 48 advantageously reads information from the database 40. This allows the status of the parts to be displayed, show progress of the process, and display communications from the customer and records if action has been taken. The tracking software 48 also advantageously writes information to the database. This allows the computer-implemented system 150 to be interactive with the customers and the tooling machine 172, and allows messages to be sent to the customers.

Figure 15:
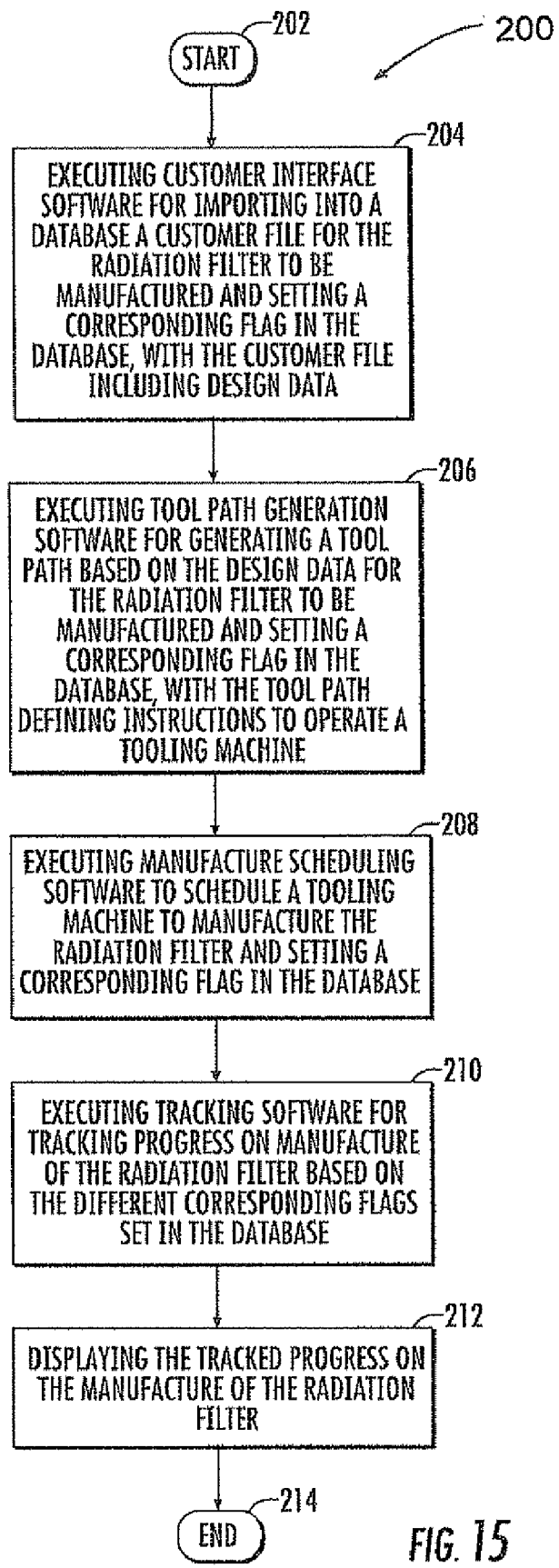
FIG. 15 is a flowchart illustrating a method for manufacturing a radiation filter in accordance with the present invention, particularly with respect to tracking progress thereof.

Referring now to the flowchart 200 illustrated in FIG. 15, a method for manufacturing a radiation filter 10 for a radiation treatment machine using a computer-implemented system 150 will now be discussed, particularly with respect to tracking progress thereof. From the start (Block 202), the method comprises operating the processor 152 at Block 204 to execute the customer interface software 42 for importing into a database 40 a customer file for the radiation filter 10 to be manufactured and setting a corresponding flag in the database after importation of the customer file. The customer file includes design data for the radiation filter 10. The tool path generation software 44 is executed by the processor 152 at Block 206 for generating a tool path based on the design data for the radiation filter 10 to be manufactured and setting a corresponding flag in the database 40 after generation of the tool path. The tool path defines instructions to operate a tooling machine.

The method further comprises operating the processor 152 at Block 208 to execute the manufacture scheduling software 46 to schedule a tooling machine to manufacture the radiation filter 10 and setting a corresponding flag in the database 40 after manufacturer of the radiation filter. The processor 152 then executes the tracking software at Block 210 for tracking progress on manufacture of the radiation filter 10 based on the different corresponding flags set in the database 40. The tracked progress on the manufacture of the radiation filter 10 is displayed at Block 212 via the display 156, and as illustrated in display screens 100, 140, 160 and 170 as provided in FIGS. 12-14. The method ends at Block 214.

The illustrated process for manufacturing patient specific radiation filters 10 equally applies to other types of patent specific items, such as hip and knee replacements, for example. The design data for the patent specific item would be received from a customer and imported into a database, and then processed as discussed above. Moreover, as readily appreciated by those skilled in the art, the above described automation process is applicable to any type of item that is machined based on customer generated design data.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer-implemented method for manufacturing at least one radiation filter for a radiation treatment machine using a computer-implemented system comprising a processor and a display operatively coupled to the processor, the method comprising:

operating the processor to perform the following
   executing customer interface software for importing into a database at least one customer file for the at least one radiation filter to be manufactured and setting a corresponding flag in the database after importation of the at least one customer file, the at least one customer file including design data,
   executing tool path generation software for generating a tool path based on the design data for the at least one radiation filter to be manufactured and setting a corresponding flag in the database after generation of the tool path, the tool path defining instructions to operate a tooling machine,
   executing manufacture scheduling software to schedule a tooling machine to manufacture the at least one radiation filter and setting a corresponding flag in the database after manufacturer of the at least one radiation filter, and
   executing tracking software for tracking progress on manufacture of the at least one radiation filter based on the different corresponding flags set in the database; and
 operating the display to display the tracked progress on the manufacture of the at least one radiation filter.

2. The computer-implemented method according to claim 1 wherein the at least one customer file is provided by a customer; and wherein the customer remotely accesses the database to view progress on the manufacture of the at least one radiation filter.

3. The computer-implemented method according to claim 2 wherein the customer accesses the database via the Internet.

4. The computer-implemented method according to claim 1 wherein the at least one customer file is provided by a customer; wherein the customer submits inquiries about the manufacture of the at least one radiation filter; and wherein the tracking software further tracks status of the inquiries being answered.

5. The computer-implemented method according to claim 1 wherein the tool path generation software stores in the database start and stop times for generating the tool path for the at least one radiation filter to be manufactured; and wherein the tracking software reads the stored information from the database for display.

6. The computer-implemented method according to claim 1 wherein the tool path generation software stores in the database at least one of a diameter, a thickness and a material type of the at least one radiation filter to be manufactured; and wherein the tracking software reads the stored information from the database for display.

7. The computer-implemented method according to claim 1 wherein the tool path generation software stores in the database that sides of the at least one radiation filter to be manufactured are to be adjusted to fit an intended radiation treatment machine; and wherein the tracking software reads the stored information from the database for display.

8. The computer-implemented method according to claim 1 wherein the tool path generation software stores in the database that the generated tool path has been verified; and wherein the tracking software reads the stored information from the database for display.

9. The computer-implemented method according to claim 1 wherein the tool path generation software stores in the database a required number of axis associated with the at least one filter to be manufactured; and wherein the tracking software reads the stored information from the database for display.

10. The computer-implemented method according to claim 1 wherein the manufacture scheduling software stores in the database the tooling machine used to manufacturer the at least one radiation filter; and wherein the tracking software reads the stored information from the database for display.

11. The computer-implemented method according to claim 1 wherein the manufacture scheduling software stores in the database identification of a tooling operator who loaded at least one radiation filter blank corresponding to the at least one radiation filter into the tooling machine; and wherein the tracking software reads the stored information from the database for display.

12. The computer-implemented method according to claim 11 wherein the manufacture scheduling software stores in the database identification of a tooling operator who unloaded the at least one radiation filter after manufacture thereof from the tooling machine; and wherein the tracking software reads the stored information from the database for display.

13. The computer-implemented method according to claim 1 wherein the manufacture scheduling software stores in the database quality control data associated with the manufactured at least one radiation filter; and wherein the tracking software reads the stored information from the database for display.

14. The computer-implemented method according to claim 1 wherein the manufacture scheduling software stores in the database that the manufactured at least one radiation filter has been cleaned and inspected; and wherein the tracking software reads the stored information from the database for display.

15. The computer-implemented method according to claim 1 further comprising storing shipping information in the database on the at least one radiation filter; and wherein the tracking software reads the stored information from the database for display.

16. The computer-implemented method according to claim 15 wherein the shipping information comprises identification of a person who packaged the at least one radiation filter for shipping, and identification of a person who verified a package label associated therewith.

17. The computer-implemented method according to claim 15 wherein the shipping information comprises identification of a shipping company used to ship the at least one radiation filter, and a corresponding tracking number associated therewith.

18. The computer-implemented method according to claim 1 further comprising storing invoicing information in the database on the at least one radiation filter; and wherein the tracking software reads the stored information from the database for display.

19. The computer-implemented method according to claim 18 wherein the invoicing information comprises at least one of a customer number, a description of the at least one radiation filter, and billing information.

20. A computer system comprising:
   a processor configured to perform the following
      execute customer interface software for importing into a database at least one customer file for at least one radiation filter to be manufactured and setting a corresponding flag in the database after importation of the at least one customer file, the at least one customer file including design data,
      execute tool path generation software for generating a tool path based on the design data for the at least one radiation filter to be manufactured and setting a corresponding flag in the database after generation of the tool path, the tool path defining instructions to operate a tooling machine,
      execute manufacture scheduling software to schedule a tooling machine to manufacture the at least one radiation filter and setting a corresponding flag in the database after manufacturer of the at least one radiation filter, and
      execute tracking software for tracking progress on manufacture of the at least one radiation filter based on the different corresponding flags set in the database; and
   a display operatively coupled to said processor to display the tracked progress on the manufacture of the at least one radiation filter.

21. The computer system according to claim 20 further comprising a memory coupled to said processor for providing the database; wherein the at least one customer file is provided by a customer; and wherein the customer remotely accesses the database to view progress on the manufacture of the at least one radiation filter.

22. The computer system according to claim 20 wherein the customer accesses the database via the Internet.

23. The computer system according to claim 20 wherein the at least one customer file is provided by a customer; wherein the customer submits inquiries about the manufacture of the at least one radiation filter; and wherein the tracking software in said processor further tracks status of the inquiries being answered.

24. The computer system according to claim 20 wherein the tool path generation software in said processor stores in the database start and stop times for generating the tool path for the at least one radiation filter to be manufactured; and wherein the tracking software in said processor reads the stored information from the database for display.

25. The computer system according to claim 20 wherein the tool path generation software stores in the database at least one of a diameter, a thickness and a material type of the at least one radiation filter to be manufactured; and wherein the tracking software in said processor reads the stored information from the database for display.

26. The computer system according to claim 20 wherein the tool path generation software stores in the database that sides of the at least one radiation filter to be manufactured are to be adjusted to fit an intended radiation treatment machine; and wherein the tracking software in said processor reads the stored information from the database for display.

27. The computer system according to claim 20 wherein the tool path generation software stores in the database that the generated tool path has been verified; and wherein the tracking software in said processor reads the stored information from the database for display.

28. The computer system according to claim 20 wherein the tool path generation software stores in the database a required number of axis associated with the at least one filter to be manufactured; and wherein the tracking software in said processor reads the stored information from the database for display.

29. The computer system according to claim 20 wherein the manufacture scheduling software in said processor stores in the database the tooling machine used to manufacturer the at least one radiation filter; and wherein the tracking software in said processor reads the stored information from the database for display.

30. The computer system according to claim 20 wherein the manufacture scheduling software in said processor stores in the database identification of a tooling operator who loaded at least one radiation filter blank corresponding to the at least one radiation filter into the tooling machine; and wherein the tracking software in said processor reads the stored information from the database for display.

31. The computer system according to claim 30 wherein the manufacture scheduling software in said processor stores in the database identification of a tooling operator who unloaded the at least one radiation filter after manufacture thereof from the tooling machine; and wherein the tracking software in said processor reads the stored information from the database for display.

32. The computer system according to claim 20 wherein the manufacture scheduling software in said processor stores in the database quality control data associated with the manufactured at least one radiation filter; and wherein the tracking software in said processor reads the stored information from the database for display.

33. The computer system according to claim 20 wherein the manufacture scheduling software in said processor stores in the database that the manufactured at least one radiation filter has been cleaned and inspected; and wherein the tracking software in said processor reads the stored information from the database for display.

34. The computer system according to claim 20 wherein shipping information is stored in the database on the at least one radiation filter; and wherein the tracking software in said processor reads the stored information from the database for display.

35. The computer system according to claim 20 wherein invoicing information is stored in the database on the at least one radiation filter; and wherein the tracking software in said processor reads the stored information from the database for display.

* * * * *